(12) United States Patent
Singh et al.

(10) Patent No.: US 9,504,068 B1
(45) Date of Patent: Nov. 22, 2016

(54) MANAGING A NETWORK CONNECTION OF A WIRELESS DEVICE

(71) Applicant: Sprint Spectrum LP, Overland Park, KS (US)

(72) Inventors: Jasinder P. Singh, Olathe, KS (US); Maulik K. Shah, Overland Park, KS (US); Siddharth S. Oroskar, Overland Park, KS (US); Anoop K. Goyal, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 676 days.

(21) Appl. No.: 13/871,848

(22) Filed: Apr. 26, 2013

(51) Int. Cl.
*H04W 76/00* (2009.01)

(52) U.S. Cl.
CPC .................. *H04W 76/00* (2013.01)

(58) Field of Classification Search
CPC . H04W 76/00; H04W 76/02; H04W 76/021; H04W 76/022; H04W 76/025; H04W 76/026; H04W 76/028; H04W 76/04; H04W 76/041; H04W 76/045; H04W 76/06; H04W 76/062; H04W 76/068
See application file for complete search history.

(56) References Cited

U.S. PATENT DOCUMENTS

| | | | |
|---|---|---|---|
| 8,638,717 B2 * | 1/2014 | Chen | H04W 36/00 370/328 |
| 2010/0074226 A1 | 3/2010 | Gandham et al. | |
| 2013/0100944 A1 * | 4/2013 | Kwon | H04W 76/026 370/338 |

* cited by examiner

*Primary Examiner* — Feben M Haile

(57) ABSTRACT

In systems and methods of maintaining a network connection of a wireless device, network connection information is associated with the wireless device and is maintained at a gateway node in communication with a first communication network and a second communication network. A first network connection between the wireless device and the first communication network is terminated, and a second network connection is established between the wireless device and the second communication network using the network connection information, wherein the association of the network connection information and the wireless device is maintained until the second network connection is established.

18 Claims, 6 Drawing Sheets

MANAGING A NETWORK CONNECTION OF A WIRELESS DEVICE

TECHNICAL BACKGROUND

An essential feature of wireless communications is the mobility of wireless devices. Enabling wireless device mobility requires wireless communication networks to manage network connections of wireless devices to maintain ongoing communication sessions, and to smoothly transition wireless devices among network access points and among access technologies. When a wireless device initiates communication with a wireless communication network, the wireless device is typically assigned network connection information which is used to deliver information to the wireless device. During a transition of the wireless device from access point to access point, or from one access technology to another access technology, the loss of the network connection information can lead to the termination of communication with the network, and may require the wireless device to reinitiate communication with the communication network.

OVERVIEW

In operation, network connection information is associated with a wireless device, and the association of the network connection information and the wireless device is maintained at a gateway node. In an embodiment, the gateway node is in communication with a first communication network and a second communication network. When the wireless device transitions from the first communication network to the second communication network, a first network connection between the wireless device and the first communication network is terminated, and a second network connection between the wireless device and the second communication network is established using the network connection information. The association of the network connection information and the wireless device is maintained after the first network connection is terminated until the second network connection is established.

DETAILED DESCRIPTION

Figure 1:
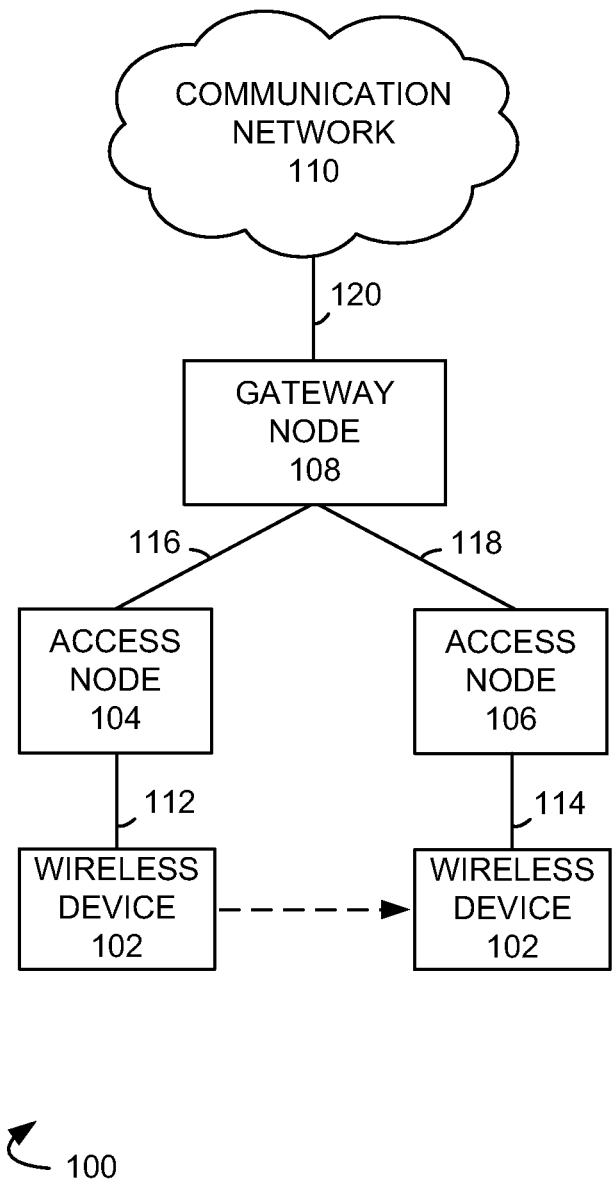
FIG. 1 illustrates an exemplary communication system to maintain a network connection of a wireless device.

FIG. 1 illustrates an exemplary communication system 100 to maintain a network connection of a wireless device comprising wireless device 102, access node 104, access node 106, gateway node 108, and communication network 110. Examples of wireless device 102 can comprise a cell phone, a smart phone, a computing platform such as a laptop, palmtop, or tablet, a personal digital assistant, or an internet access device, including combinations thereof. Wireless device 102 can communicate with access node 104 over communication link 112, and can communicate with access node 106 over communication link 114.

Each of access nodes 104 and 106 is a network node capable of providing wireless communications to wireless device 102, and can be, for example, a base transceiver station, a radio base station, an eNodeB device, or an enhanced eNodeB device. Access node 104 is in communication with gateway node 108 over communication link 116, and access node 106 is in communication with gateway node 108 over communication link 118. In an embodiment, access nodes 104 and 106 can each be associated with a different communication network. In an embodiment, access nodes 104 and 106 can each use a different radio access technology. In an embodiment, access nodes 104 and 106 can each use a different multiplexing scheme (such as frequency division duplexing, time division duplexing, orthogonal frequency division multiplexing, and the like). While access nodes 104 and 106 are illustrated as separate functional blocks, physical separation is not required, and access nodes 104 and 106 can comprise co-located hardware components and/or separate logical components of a single hardware component.

Gateway node 108 can comprise a processor and associated circuitry to execute or direct the execution of computer-readable instructions, and can be configured to maintain network connection information associated with wireless device 102. Gateway node 108 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 108 can receive instructions and other input at a user interface. Examples of gateway node 108 can include a standalone computing device, a computer system, or a network component, such as an access service network gateway (ASN-GW), a packet data network gateway (P-GW), a serving gateway (S-GW), a mobile switching controller (MSC), a packet data serving node (PDSN), call processing equipment, a home agent, a radio node controller (RNC), a subscriber profile system (SPS), authentication, authorization, and accounting (AAA) equipment, and the like, including combinations thereof. Gateway node 108 is in communication with communication network 110 over communication link 120.

Communication network 110 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 110 can be capable of carrying voice information and other data, for example, to support communications by a wireless device such as wireless device 102. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 110 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 110 may also comprise a wireless network, including base stations, wireless communication nodes, telephony switches, internet routers, network gateways, computer systems, communication links, or some other type of communication equipment, and combinations thereof.

Communication links 112, 114, 116, 118 and 120 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access nodes 104 and 106, gateway node 108 and communication network 110 which are omitted for clarity, including additional processing nodes, routers, gateways, and physical and/or wireless data links for carrying data among the various network elements.

When a wireless device initiates communication with a wireless communication network, the wireless device is typically assigned network connection information which is used to deliver information to the wireless device. During a transition of the wireless device from access point to access point, or from one access technology to another access technology, the loss of the network connection information can lead to the termination of communication with the network, and may require the wireless device to reinitiate communication with the communication network. For example, wireless device 102 may change from communicating with access node 104 to communicating with access node 106. Further, access nodes 104 and 106 may each use different multiplexing schemes, or different radio access technologies. Wireless device 102 can be involved in a communication session through access node 104 (such as a voice call, or downloading a file, or streaming a media file, and the like). When wireless device 102 changes from communicating with access node 104 to communicating with access node 106, there is a risk that a communication session may be interrupted which can result in, for example, a dropped or interrupted voice call, or an interrupted data download operation, and so forth. In one example, where access nodes 104 and 106 use different multiplexing schemes or different radio access technologies, the communication link between wireless device 102 and access node 104 can be terminated (e.g., torn down) before communication is established between wireless device 102 and access node 106. Unless the network communication information which is associated wireless device 102 and access node 104 is maintained and used in the communication between wireless device 102 and access node 106, the communication session may be interrupted.

In operation, network connection information is associated with wireless device 102, and the association of the network connection information and wireless device 102 is maintained at gateway node 108. Gateway node 108 is typically in communication with a first communication network and a second communication network. A first network connection between the wireless device and the first communication network is terminated, and a second network connection between the wireless device and the second communication network is established using the network connection information, wherein the association of the network connection information and the wireless device is maintained until the second network connection is established.

Figure 2:
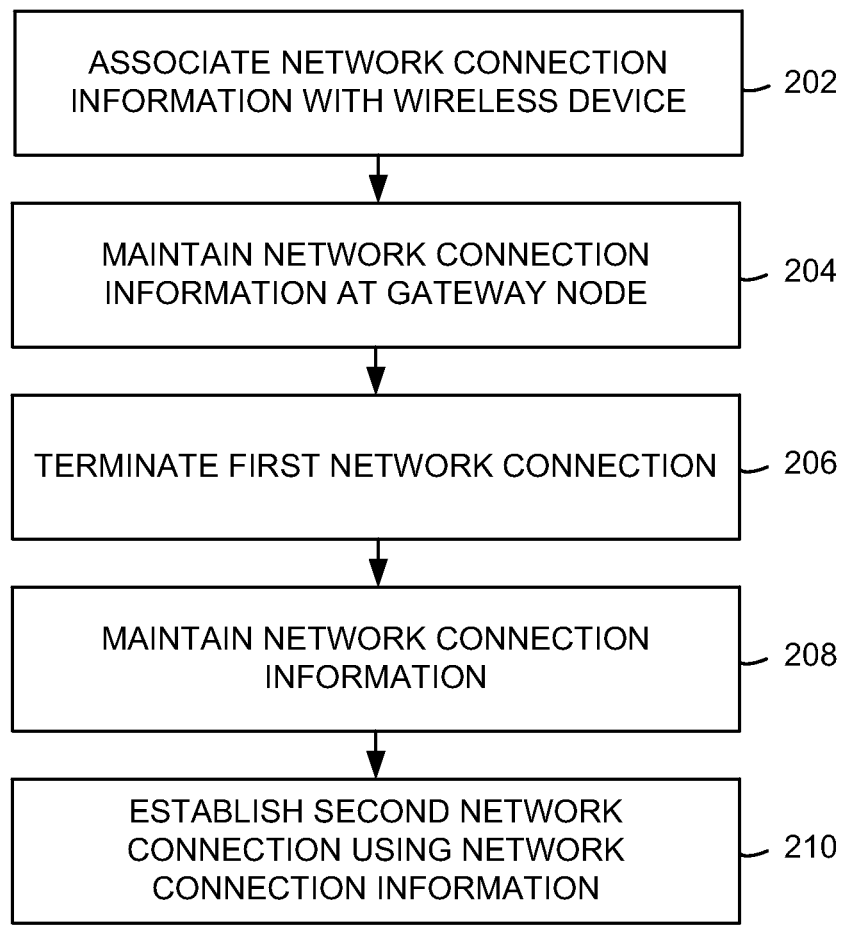
FIG. 2 illustrates an exemplary method of maintaining a network connection of a wireless device.

FIG. 2 illustrates an exemplary method of maintaining a network connection of a wireless device. In operation 202, network connection information is associated with the wireless device. For example, when wireless device 102 establishes communication with access node 104, network connection information can be associated with wireless device 102 to permit delivery of information to wireless device 102 via access node 104. In an embodiment, the network connection information comprises mobile internet protocol (MIP) network connection information.

In operation 204, the association of the network connection information and the wireless device is maintained at a gateway node. For example, the network connection information associated with wireless device 102 can be maintained at gateway node 108. Gateway node 108 can also be in communication with a first communication network and a second communication network. For example, access nodes 104 and 106 can each be associated with a different communication network.

In operation 206, a first network connection between the wireless device and the first communication network is terminated. For example, it may be determined to transition wireless device 102 from communicating with access node 104 to communicating with access node 106. The transition may be determined due to wireless device mobility, or for load balancing between communication links 112 and 114, or to minimize roaming by wireless device 102 on a foreign network from a home network, or for some similar purpose. In an embodiment, the first network connection can be terminated at the direction of a controller node, such as a mobility management entity (MME), a base station controller (BSC), or a similar network entity.

In operation 208, the network connection information is maintained. For example, to prevent the network connection associated with wireless device 102 from being disassociated from wireless device 102 when the network connection between wireless device 102 and access node 104 is terminated, when the first network connection between wireless device 102 and access node 104 is terminated, the network connection information associated with wireless device 102 is maintained. In an embodiment, the network connection information can be maintained at gateway node 108.

In operation 210, the second network connection between the wireless device and the second communication network over a second channel is established using the network connection information. For example, the second network connection can be established between wireless device 102 and access node 106. The second network connection can be established using the network connection information. In an embodiment, when establishing the second network connection, the association of the network connection information and the wireless device is maintained until the second network connection is established. In an embodiment, the network connection information is maintained at the instruction of a controller node of communication system 100 until the second network connection is established, where the controller node is in communication with the gateway node, the first communication network, and the second communication network.

In an embodiment, when the first network connection is terminated, a timer is started, for example, at gateway node 108. While the timer is running the association of the network connection information and the wireless device is maintained. Further, to enable the maintenance of the association until the second network connection is established, the timer can be extended, for example, at the direction of a controller node of communication system 100, or it can be extended at the direction of gateway node 108.

In an embodiment, the first network connection between the wireless device and the first communication network is terminated at the instruction of a controller node of communication system 100. When the first network connection is terminated, a timer can be started gateway node 108, wherein while the timer is running the association of the network connection information and the wireless device is maintained. Further, after the timer is started, the timer can be extended at the gateway node to maintain the association of the network connection information and the wireless device until the second network connection is established.

Figure 3:
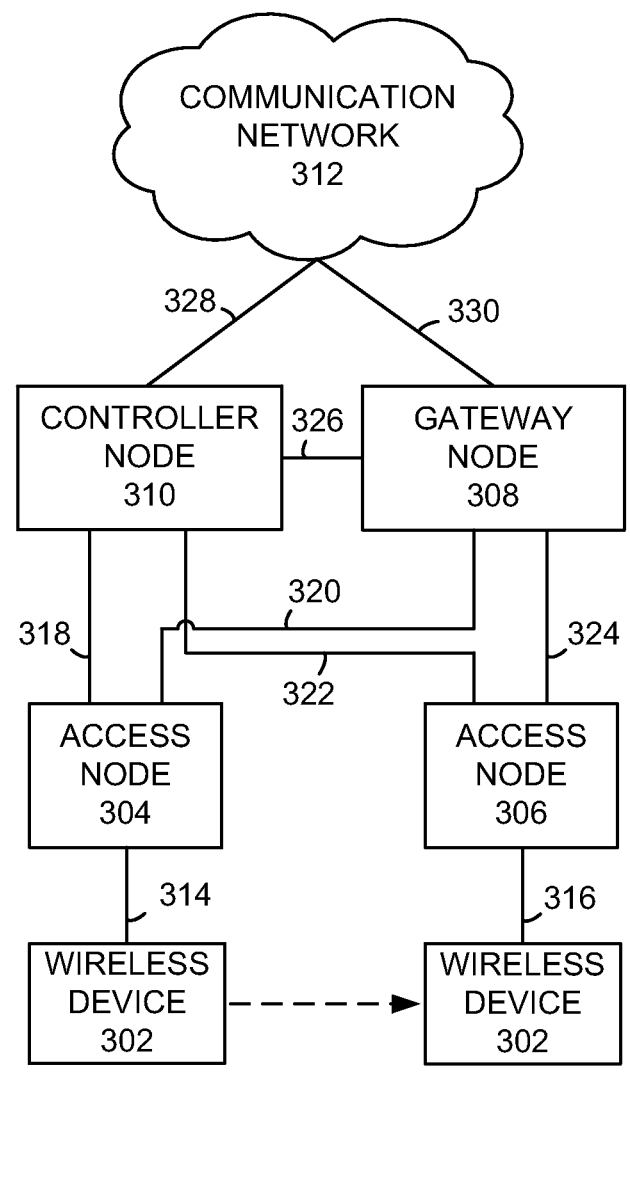
FIG. 3 illustrates another exemplary communication system to maintain a network connection of a wireless device.

FIG. 3 illustrates another exemplary communication system 300 to maintain a network connection of a wireless device comprising wireless device 302, access node 304, access node 306, gateway node 308, controller node 310, and communication network 312. Examples of wireless device 302 can comprise a cell phone, a smart phone, a computing platform such as a laptop, palmtop, or tablet, a personal digital assistant, or an internet access device, including combinations thereof. Wireless device 302 can communicate with access node 304 over communication link 314, and can communicate with access node 306 over communication link 316.

Each of access nodes 304 and 306 is a network node capable of providing wireless communications to wireless device 302, and can be, for example, a base transceiver station, a radio base station, an eNodeB device, or an enhanced eNodeB device. Access node 304 is in communication with controller node 310 over communication link 318 and with gateway node 308 over communication link 320. Access node 106 is in communication with controller node 310 over communication link 322 and with gateway node 308 over communication link 324. In an embodiment, access nodes 304 and 306 can each be associated with a different communication network. In an embodiment, access nodes 304 and 306 can each use a different radio access technology. In an embodiment, access nodes 304 and 306 can each use a different multiplexing scheme (such as frequency division duplexing, time division duplexing, orthogonal frequency division multiplexing, and the like). While access nodes 304 and 306 are illustrated as separate functional blocks, physical separation is not required, and access nodes 304 and 306 can comprise co-located hardware components and/or separate logical components of a single hardware component.

Gateway node 308 can comprise a processor and associated circuitry to execute or direct the execution of computer-readable instructions, and can be configured to maintain network connection information associated with wireless device 302. Gateway node 308 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 308 can receive instructions and other input at a user interface. Examples of gateway node 308 can include a standalone computing device, a computer system, or a network component, such as an access service network gateway (ASN-GW), a packet data network gateway (P-GW), a serving gateway (S-GW), a mobile switching controller (MSC), a packet data serving node (PDSN), call processing equipment, a home agent, a radio node controller (RNC), a subscriber profile system (SPS), authentication, authorization, and accounting (AAA) equipment, and network gateways, including combinations thereof. Gateway node 308 is in communication with controller node 310 over communication link 326 and with communication network 312 over communication link 330.

Controller node 310 can comprise can comprise a processor and associated circuitry to execute or direct the execution of computer-readable instructions, and can be configured to maintain network connection information associated with wireless device 302. Controller node 310 can control the setup and maintenance of a communication session over communication network 312 by wireless device 302. Controller node 310 can comprise a mobile switching center (MSC), a dispatch call controller (DCC), a mobility management entity (MME), or other similar network node. Controller node 310 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 310 can receive instructions and other input at a user interface. Controller node 310 is in communication with communication network 312 over communication link 328.

Communication network 312 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 312 can be capable of carrying voice information and other data, for example, to support communications by a wireless device such as wireless device 302. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 312 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 312 may also comprise a wireless network, including base stations, wireless communication nodes, telephony switches, internet routers, network gateways, computer systems, communication links, or some other type of communication equipment, and combinations thereof.

Communication links 314, 316, 318, 320, 322, 324, 326, 328 and 330 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access nodes 304 and 306, gateway node 308, controller node 310 and communication network 312 which are omitted for clarity, including additional processing nodes, routers, gateways, and physical and/or wireless data links for carrying data among the various network elements.

Figure 4:
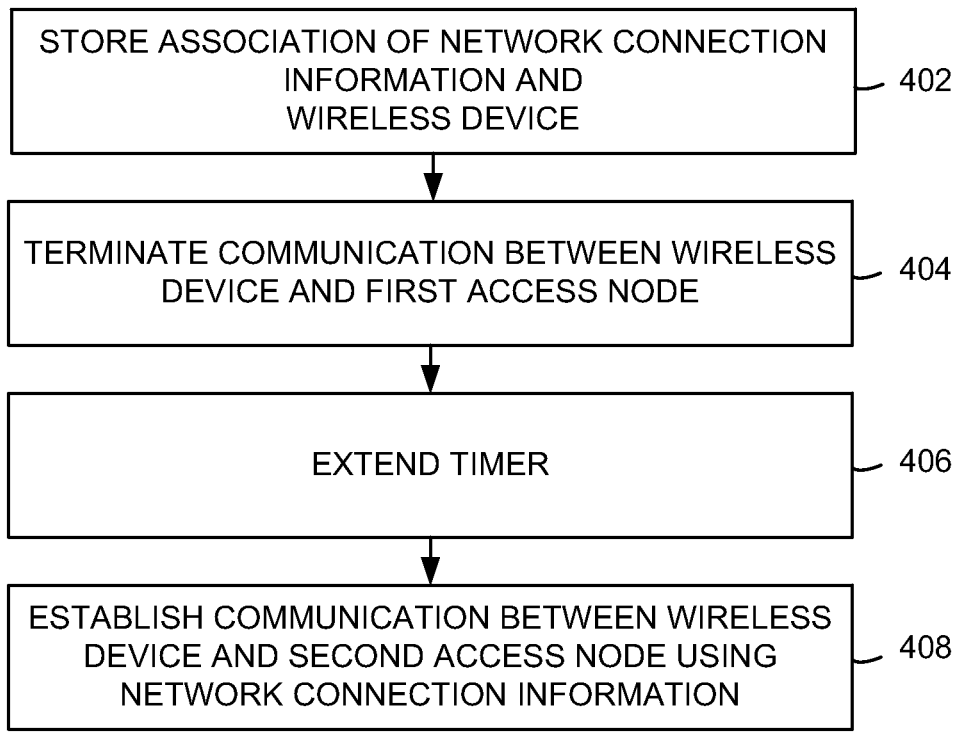
FIG. 4 illustrates another exemplary method of maintaining a network connection of a wireless device.

FIG. 4 illustrates another exemplary method of maintaining a network connection of a wireless device. In operation 402, an association between network connection information and a wireless device in communication with a first access node is stored at a gateway node, wherein the gateway node is in communication with the first access node and a second access node. For example, an association between network connection information and wireless device 302 can be stored at gateway node 308.

The network connection information can be associated with wireless device 302 when wireless device 302 establishes communication with access node 304, to permit delivery of information to wireless device 302 via access node 304. In an embodiment, the network connection information comprises mobile internet protocol (MIP) network connection information. Gateway node 308 can be in communication with access node 304 and access node 306. In an embodiment, access nodes 304 and 306 can be associated with different communication network. In an embodiment, access nodes 304 and 306 can use different radio access technologies. In an embodiment, access nodes 304 and 306 can use different multiplexing schemes.

In operation 404, the communication between the wireless device and the first access node is terminated. For example, it may be determined to transition wireless device 302 from communicating with access node 304 to communicating with access node 306. The transition may be determined due to wireless device mobility, or for load balancing between communication links 314 and 316, or to minimize roaming by wireless device 302 on a foreign network from a home network, or for some similar purpose. In an embodiment, the first network connection can be terminated at the direction of controller node 310.

The gateway node is instructed to extend a timer (operation 406). For example, when the first network connection is terminated, a timer is started, for example, at gateway node 308. While the timer is running the association of the network connection information and the wireless device is maintained. Further, to enable the maintenance of the association until the second network connection is established, the timer can be extended, for example, at the direction of controller node 310, or at the direction of gateway node 308.

In operation 408, communication between the wireless device and the second access node is established using the network connection information before the timer expires. For example, the second network connection can be established between wireless device 302 and access node 306 using the network connection information. In an embodiment, when establishing the second network connection, the association of the network connection information and the wireless device is maintained until the second network connection is established. In an embodiment, the network connection information is maintained at the instruction of controller node 310 until the second network connection is established, where controller node 310 is in communication with gateway node 308, the first communication network, and the second communication network.

Figure 5:
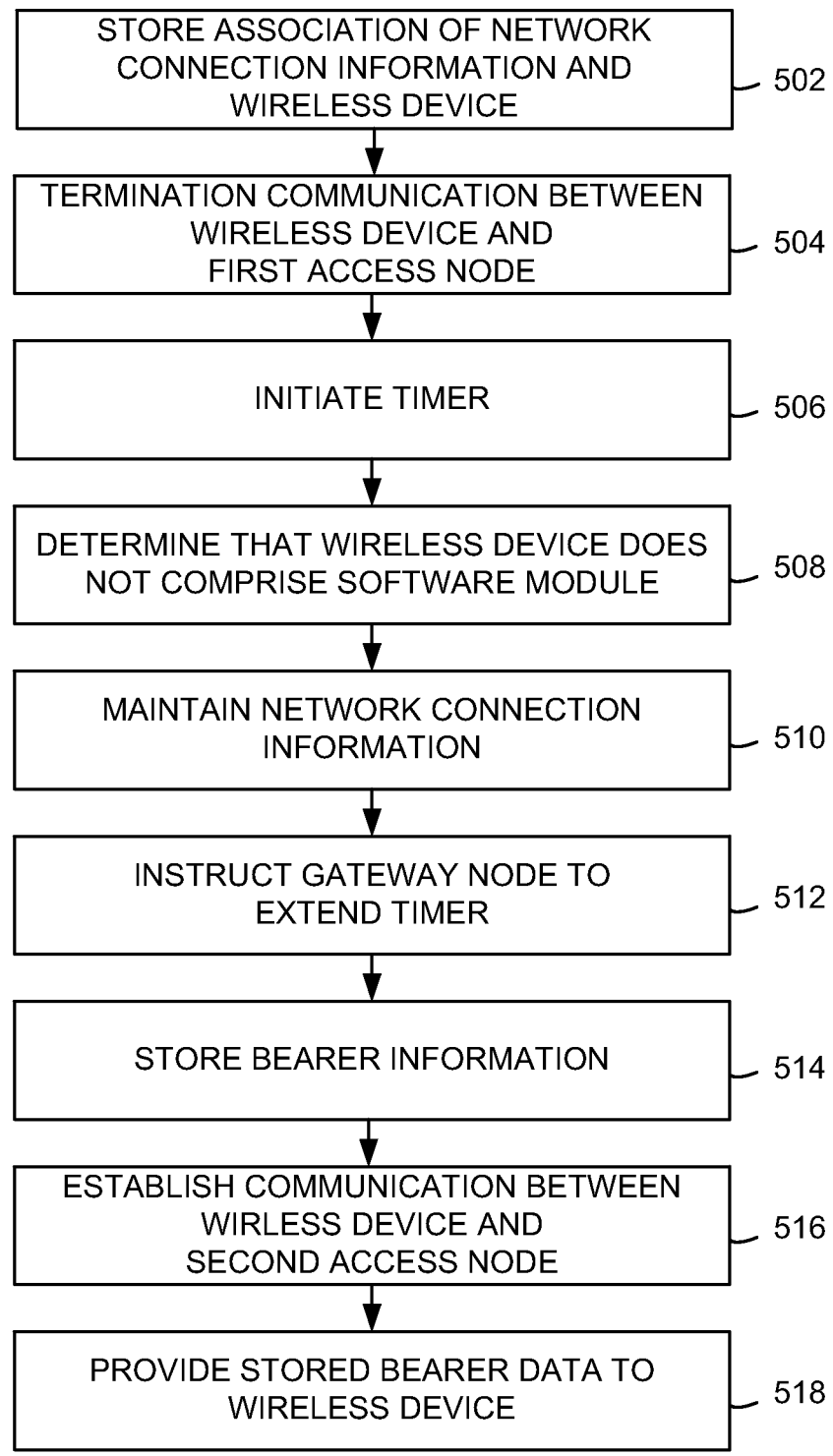
FIG. 5 illustrates another exemplary method of maintaining a network connection of a wireless device.

FIG. 5 illustrates another exemplary method of maintaining a network connection of a wireless device. In operation 502, an association between network connection information and a wireless device in communication with a first access node is stored at a gateway node, wherein the gateway node is in communication with the first access node and a second access node. For example, network connection information can be associated with wireless device 302, and the association of the network connection information and wireless device 302 can be stored at gateway node 308. When wireless device 302 establishes communication with access node 304, network connection information can be associated with wireless device 302 to permit delivery of information to wireless device 302 via access node 304. In an embodiment, the network connection information comprises mobile internet protocol (MIP) network connection information.

In operation 504, communication between the wireless device and the first access node is terminated. For example, it may be determined to transition wireless device 302 from communicating with access node 304 to communicating with access node 306. The transition may be determined due to wireless device mobility, or for load balancing between communication links 314 and 316, or to minimize roaming by wireless device 302 on a foreign network from a home network, or for some similar purpose. In an embodiment, the communication between the wireless device and the first access node can be terminated at the direction of a controller node, such as a mobility management entity (MME), a base station controller (BSC), or a similar network entity.

In operation 506, a timer is initiated. For example, when the communication between the wireless device and the first access node is terminated, a timer can be started, for example, at gateway node 308. While the timer is running the association of the network connection information and the wireless device is maintained.

In operation 508, it can be determined that the wireless device does not comprise a software module to instruct the gateway node to extend the timer, and based on the determination, the gateway node is instructed to extend the timer. For example, wireless device 302 in some cases can be configured with a software module, such as computer-readable instructions or computer-readable codes, which can provide instructions to gateway node 308 via access node 304 to extend the timer. In an embodiment, the instructions can be provided from wireless device 302 to gateway node 308. In an embodiment, the instructions can be provided from wireless device 302 to controller node 310, and controller node 310 can instruct gateway node 308 to extend the timer. The instructions can be provided to gateway node 308 before, during, or after the termination of communication between wireless device 302 and access node 304. In an embodiment, wireless device 302 can provide an indication of whether it is configured with the software module, for example, at the request of controller node 310. In an embodiment, wireless device 302 can provide an indication of whether it is configured with the software module at the instruction of the software module or other computer-readable instructions configured on wireless device 302. Also, in an embodiment, an indication of whether wireless device 302 is configured with the software module can be received from a subscriber record in communication system 300 such as a home location record node (HLR), a home subscriber server node (HSS), and the like (not illustrated).

In operation 510, the network connection information is maintained. The network connection information can be maintained at gateway 308. In operation 512, the gateway node can be instructed to extend the timer. For example, when it is determined that wireless device 302 does not comprise the software module to instruct gateway node 308 to extend the timer, upon the termination of communication between wireless device 302 and access node 304, the timer can be started at gateway node 308, and further, gateway node 308 can be instructed to extend the timer. While the timer is running, the association of the network connection information and the wireless device is maintained. The timer can be extended at gateway node 308 to maintain the association of the network connection information and the wireless device until communication between wireless device 302 and a second access node is established.

In operation 514, bearer information of the wireless device is stored. For example, wireless device 302 can be engaged in a communication session when the communication between wireless device 302 and access node 304 is terminated. The communication session can involve wireless device 302 receiving information, for example, for a voice communication session, or a file download, or a streaming media file, and so forth, over a bearer channel from access node 304. The bearer information can be stored, for example, at gateway 308, when the communication between wireless device 302 and access node 304 is terminated.

In operation 516, communication is established between the wireless device and a second access node using the network connection information before the timer expires. For example, communication can be established between wireless device 302 and access node 306 before the timer expires. Using the network connection information to establish communication between access node 306 and wireless device 302 permits the continuation of the communication session in which wireless device 302 was engaged when communication between access node 304 and wireless device 302 was terminated. In an embodiment, the first access node is associated with a first network and the second access node is associated with a second network. In an embodiment, the first access node uses a first duplexing scheme and the second access node uses a second duplexing scheme. For example, the first duplexing scheme can be time division duplexing and the second duplexing scheme can be frequency division duplexing. As another example, the first duplexing scheme can be frequency division duplexing and the second duplexing scheme can be time division duplexing. Other duplexing and multiplexing schemes can also be used, and there is no limitation to only time division duplexing and frequency division duplexing. In addition, or alternatively, the first and second access nodes can use different radio access technologies.

In operation 518, the stored bearer data is provided to the wireless device upon establishing communication between the wireless device and the second access node. For example, when communication is established between wireless device 302 and access node 306, bearer data stored at gateway node 308 can be provided to wireless device 302 through access node 306. The communication session of wireless device 302 can be continued using the network communication information despite the termination of the communication between wireless device 302 and access node 304.

Figure 6:
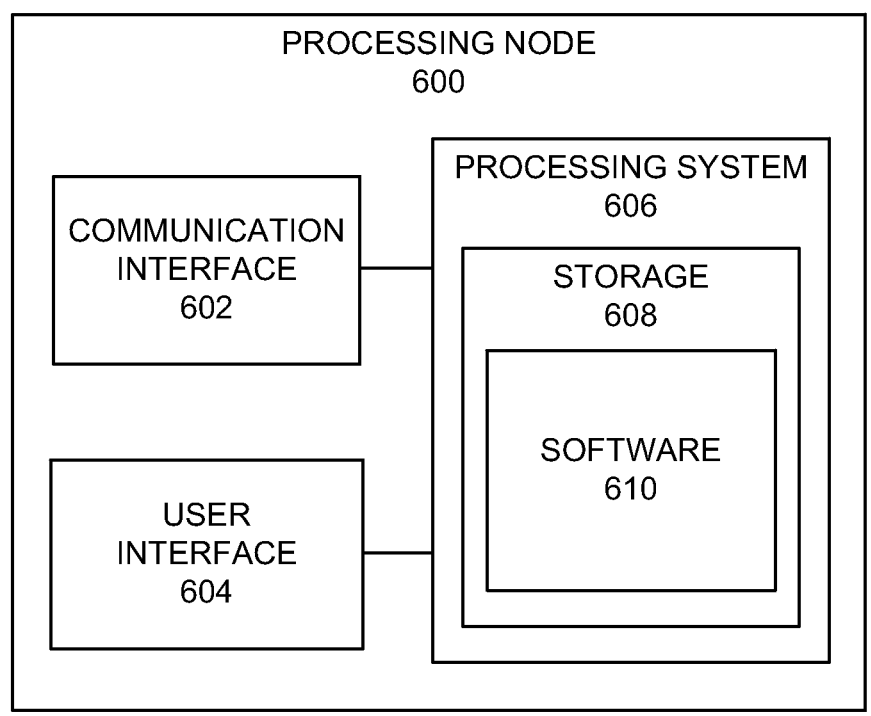
FIG. 6 illustrates an exemplary processing node.

FIG. 6 illustrates an exemplary processing node 600 in a communication system. Processing node 600 comprises communication interface 602, user interface 604 and processing system 606 in communication with communication interface 602 and user interface 604. Processing node 600 can be configured to maintain a network connection of a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include gateway node 108, controller node 310, and gateway node 308. Processing node 600 can also be an adjunct or component of a network element, such as an element of gateway node 108, controller node 310, or gateway node 308. Processing node 600 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of maintaining a network connection of a wireless device, comprising:
associating network connection information with the wireless device;
storing the association of the network connection information and the wireless device at a gateway node, wherein the gateway node is in communication with a first communication network and a second communication network;
terminating a first network connection between the wireless device and the first communication network;
initiating a timer at the gateway node when the first network connection is terminated;
maintaining the association of the network connection information and the wireless device at the gateway node while the timer is running;
storing bearer data for the wireless device at the gateway node;
establishing a second network connection between the wireless device and the second communication network using the network connection information before the timer expires, wherein the association of the network connection information and the wireless device is maintained at the gateway node until the second network connection is established; and
providing the bearer data to the wireless device subsequent to establishing the second network connection.

2. The method of claim 1, wherein the network connection information is associated with the wireless device when the first network connection is established between the wireless device and the first access node.

3. The method of claim 1, further comprising terminating the first network connection between the wireless device and the communication network over a first channel, and establishing the second network connection between the wireless device and the second communication network over a second channel using the network connection information.

4. The method of claim 1, further comprising maintaining the association of the network connection information and the wireless device at the instruction of a controller node until the second network connection is established, wherein the controller node is in communication with the gateway node, the first communication network, and the second communication network.

5. The method of claim 1, wherein maintaining the association of the network connection information and the wireless device comprises:
extending the timer to maintain the association of the network connection information and the wireless device until the second network connection is established.

6. The method of claim 5, further comprising:
instructing by a controller node the terminating of the first network connection between the wireless device and the first communication network;
starting a timer at the gateway node, wherein while the timer is running the association of the network connection information and the wireless device is maintained; and
extending the timer at the gateway node at the instruction of the controller node to maintain the association of the network connection information and the wireless device until the second network connection is established.

7. A method of maintaining a network connection of a wireless device, comprising:
associating network connection information with the wireless device;
storing at a gateway node the association between the network connection information and the wireless device in communication with a first access node, wherein the gateway node is in communication with the first access node and a second access node;
terminating a first communication between the wireless device and the first access node;
initiating a timer at the gateway node when the first communication is terminated;
maintaining the association of the network connection information and the wireless device at the gateway node while the timer is running;
storing bearer data for the wireless device at the gateway node;
establishing a second communication between the wireless device and the second access node using the network connection information before the timer expires, wherein the association of the network connection information and the wireless device is maintained at the gateway node until the second communication is established; and
providing the bearer data to the wireless device subsequent to establishing the second communication between the wireless device and the second access node.

8. The method of claim 7, wherein the first access node is associated with a first network and the second access node is associated with a second network.

9. The method of claim 7, wherein the first access node uses a first duplexing scheme and the second access node uses a second duplexing scheme.

10. The method of claim 9, wherein the first duplexing scheme is time division duplexing and the second duplexing scheme is frequency division duplexing.

11. The method of claim 9, wherein the first duplexing scheme is frequency division duplexing and the second duplexing scheme is time division duplexing.

12. The method of claim 7, further comprising:
storing at the gateway node the association between the network connection information and the wireless device, wherein the wireless device is engaged in a communication session; and
establishing communication between the wireless device and the second access node and continuing the communication session using the network connection information.

13. The method of claim 7, further comprising:
determining that the wireless device does not comprise a software module to instruct the gateway node to extend the timer, and instructing the gateway node to extend the timer.

14. A system for maintaining a network connection of a wireless device, comprising:
a processing node configured to:
associate network connection information with the wireless device;
store the association of the network connection information and the wireless device at a gateway node, wherein the gateway node is in communication with a first communication network and a second communication network;

terminate a first network connection between the wireless device and the first communication network;

initiate a timer at the gateway node when the first network connection is terminated;

maintain the association of the network connection information and the wireless device at the gateway node while the timer is running;

store bearer data for the wireless device at the gateway node;

establish a second network connection between the wireless device and the second communication network using the network connection information before the timer expires, wherein the association of the network connection information and the wireless device is maintained at the gateway node until the second network connection is established; and provide the bearer data to the wireless device subsequent to establishing the second network connection.

15. The system of claim 14, wherein the network connection information is associated with the wireless device when the first network connection is established between the wireless device and the first access node.

16. The system of claim 14, wherein the processing node is further configured to:

terminate the first network connection between the wireless device and the communication network over a first channel; and establish the second network connection between the wireless device and the second communication network over a second channel using the network connection information.

17. The system of claim 14, wherein the processing node is further configured to maintain the association of the network connection information and the wireless device at the instruction of a controller node until the second network connection is established, wherein the processing node is in communication with the gateway node, the first communication network, and the second communication network.

18. The system of claim 14, wherein the processing node is further configured to:

extend the timer to maintain the association of the network connection information and the wireless device until the second network connection is established.

* * * * *